Figure 1:
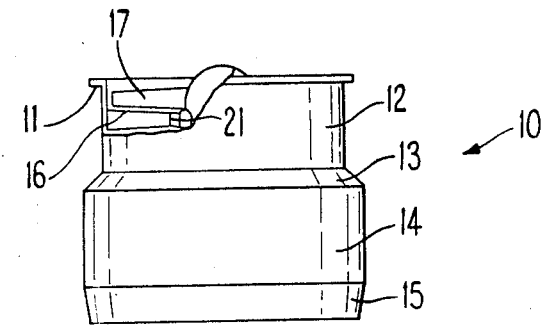

United States Patent

[11] 3,588,267

| [72] | Inventors | Wilfred Henry Wilkinson<br>Turnditch;<br>Paul William Cooper, Castle Donington,<br>England |
|---|---|---|
| [21] | Appl. No. | 833,937 |
| [22] | Filed | June 17, 1969 |
| [45] | Patented | June 28, 1971 |
| [73] | Assignee | Rolls-Royce Limited<br>Derby, England |
| [32] | Priority | June 27, 1968 |
| [33] | | Great Britain |
| [31] | | 30787/68 |

[54] BLADE ASSEMBLY FOR A FLUID FLOW MACHINE
6 Claims, 2 Drawing Figs.

[52] U.S. Cl............................................... 415/135,
415/214, 415/216
[51] Int. Cl...................................................... F1d 5/00,
F1d 9/00

[50] Field of Search.................................................. 230/133;
416/241, 500; 415/137, 135, 214, 216, 217, 191,
190, 195

[56] References Cited
UNITED STATES PATENTS
2,868,441   1/1959   Reutt............................ 230/133
FOREIGN PATENTS
660,383   11/1951   Great Britain................ 415/196
901,826   7/1962   Great Britain................ 415/190
994,568   6/1965   Great Britain................ 415/190

Primary Examiner—Henry F. Raduazo
Attorney—Cushman, Darby and Cushman

ABSTRACT: A fluid flow machine has an apertured metallic casing and a hub between which extend aerofoil blades of synthetic resin material, the roots of the blades being mounted in the apertures of the casing and being retained therein by means of a member made of an elastomeric material which allows for differential thermal expansion.

PATENTED JUN28 1971

3,588,267

Inventors
WILFRED HENRY WILKINSON
PAUL WILLIAM COOPER
By
Cushman, Darby & Cushman Attorneys

BLADE ASSEMBLY FOR A FLUID FLOW MACHINE

This invention concerns a blade assembly for a fluid flow machine, and although it is not so restricted, it particularly concerns a blade assembly for a vertical lift jet engine, that is to say an engine capable of producing lift forces on an aircraft independently of the aerodynamic forces acting thereon in flight.

According to the present invention, there is provided a blade assembly for a fluid flow machine, the same assembly comprising a hub member, an annular casing member which is mounted concentrically about the hub member, and at least one stage of angularly spaced apart aerofoil-shaped blades which extend between said members and which are rigidly connected to the hub member, the casing member and the said blades being made of different materials, and each said blade having a root portion which is mounted in an aperture in the said casing member and is retained therein by means of a member made of elastomeric material which allows for differential thermal expansion between the casing member and the said blade.

The term "blade" is used in this specification in a broad sense as including bladelike members such, for example, as stator vanes.

Preferably, the blades are bonded to the casing member by the member of elastomeric material.

The elastomeric material of the member is preferably a synthetic polymer or copolymer, and in one preferred embodiment it is a polyurethane.

The casing member may be made of a metal or of an alloy, while the blades may be made at least partly of synthetic resin material.

In a preferred embodiment, the casing member is made of an aluminum alloy, while the blades and hub member are made of a glass fiber reinforced synthetic resin material. Thus the blades and hub member may be made of a laminated epoxy resin reinforced with glass fibers.

Advantageously, the casing member is adapted to form at least part of the casing of a compressor, the said blades being stator blades.

The invention also includes a fluid flow machine having a compressor provided with a blade assembly as set forth above, and the fluid flow machine may be a gas turbine vertical lift engine.

Figure 2:
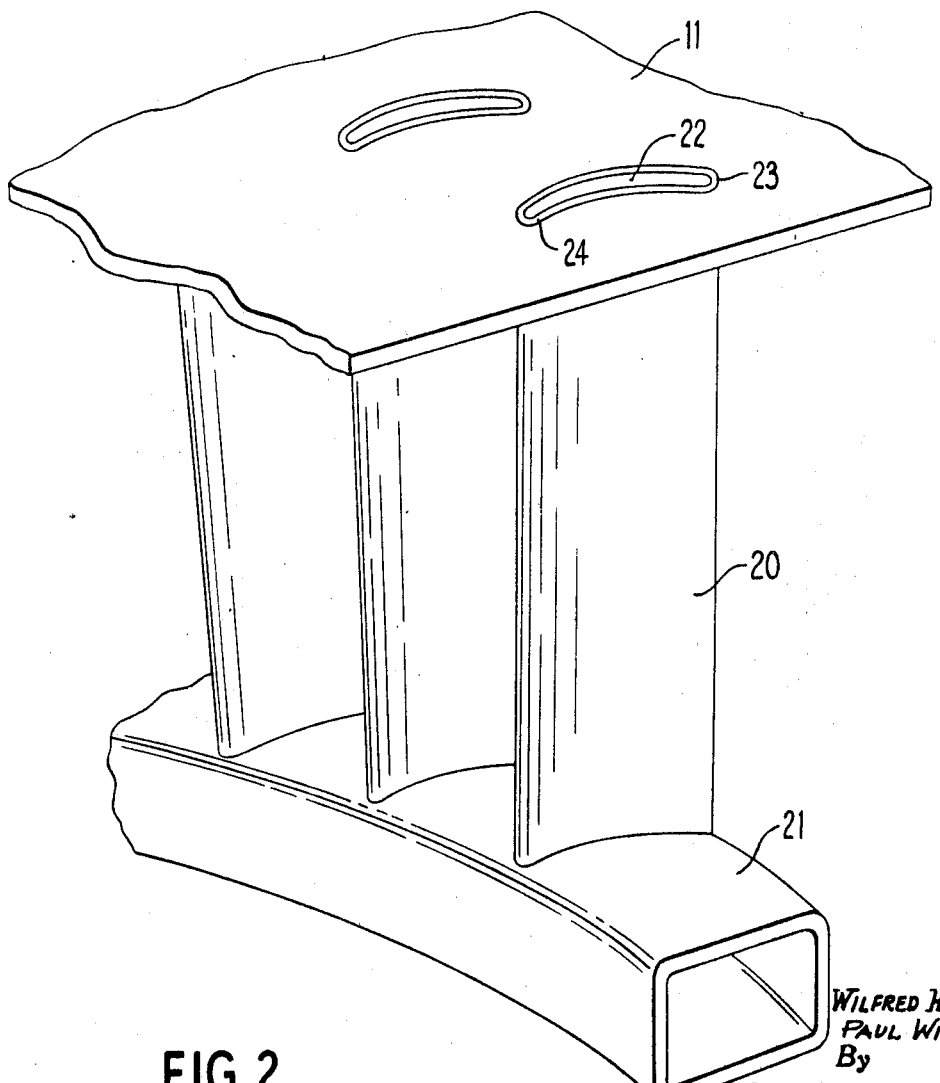

The invention will be described, merely by way of example, with reference to the accompanying drawings, in which:

FIG. 1 is an elevational view, partly broken-away, of a gas turbine vertical lift engine having a blade assembly in accordance with the present invention, and FIG. 2 is a perspective view on an enlarged scale of part of the blade assembly shown in FIG. 1.

Referring to the drawings, there is shown a gas turbine vertical lift engine 10 having an annular casing member 11, preferably made of an aluminum alloy. Mounted within the casing member 11, in axial flow series, there is a compressor means 12, combustion equipment 13, turbine means 14 adapted to drive the compressor means 12, and an exhaust duct 15 terminating in a jet nozzle, all operating in the well-known manner. The compressor means 12 has a plurality of stator stages 16 which alternate with rotor stages 17.

The engine 10 is designed to be mounted with its longitudinal axis vertical or substantially vertical in an aircraft, and is adapted to operate only for creating vertical lift forces on the aircraft, that is to say in assisting takeoff and landing but not in forward propulsion. For this reason, it is essential that the engine 10 should have the minimum possible weight.

Reduction of weight of the engine 10 is in part achieved by using stator stages 16 comprising a plurality of angularly spaced apart aerofoil-shaped stator vanes 20 made of a synthetic resin material reinforced with glass fiber. The stator vanes 20 extend between the casing member 11 and a hub member 21 which is mounted concentrically within the casing member 11. The stator vanes 20 are rigidly connected to the hub member 21 which is also made of the said synthetic resin material reinforced with glass fiber.

Each stator vane 20 has a root portion 22 of which only the radially outermost part is shown in FIG. 2. The root portions 22 of the stator vanes 20 are retained in the casing member 11 in appropriately located angularly spaced apart apertures 23 therein.

It will be appreciated that the considerable difference in the coefficient of thermal expansion between a metal or an alloy of which the casing member 11 is made, and the reinforced synthetic resin material of which the stator vanes 20 are made, raises severe problems in operation, since it is required of the stator vane mounting that it should retain the stator vanes securely in position on the one hand, but on the other hand that it should cope with the said differential effect of the termal expansion. For this reason the apertures 23 are made somewhat larger than the root portions 22 to define a space therebetween and a member 24 made of an elastomeric material fills the space and serves to bond the stator vanes 20 to the casing member 11. The member 24 of elastomeric material is sufficiently stiff to retain the stator vanes 20 in position, but at the same time is sufficiently flexible to take up the differential thermal expansion of the casing member 11 and stator vanes 20. The preferred elastomeric material of the member 24 is a polyurethane which, after its introduction and setting will exhibit the properties described above, but other elastomeric synthetic polymer or copolymer materials may be used, e.g. polyacrylonitrile.

The members 24 may be introduced by positioning the stator vanes 20 in the aperture 23, and then pouring in or molding the elastomeric material to form the member 24 in situ. Alternatively, appropriately shaped pieces of elastomeric material may be initially molded to form the members 24, and then the members 24 are inserted into the space and subsequently glued to the casing member 11 and to the stator vanes 20.

As will be appreciated, the use of the elastomeric material for the members 24 allows for the said differential thermal expansion without the necessity for mechanical joints and consequent frettage of the latter. The members 24 of elastomeric material also serves as a gas seal.

The hub member 21 may constitute a load-bearing structure and may, for example, carry a bearing (not shown).

While the invention has been described with reference to gas turbine vertical lift engines, the invention is also applicable to other fluid flow machines.

We claim:

1. A blade assembly for a fluid flow machine comprising: a hub member; at least one stage of angularly spaced apart aerofoil-shaped blades rigidly connected to said hub member and extending therefrom, each of said blades having a root portion at its end remote from said hub member; an annular casing member made of a different material from and having a different thermal expansion than said blades, said annular casing member being mounted concentrically of said hub member and having a plurality of angularly spaced apart apertures, each of the apertures being arranged to receive a root portion of one of said blades and being larger than and surrounding the root portion to define a space between the casing member and the root portion; and a member made of an elastomeric material filling each space between the root portion of a respective blade and said casing member to operatively bond the same to each other, said member made of elastomeric material having a greater flexibility than said casing member and said blades to compensate for differential thermal expansion between the casing member and the respective blade.

2. A blade assembly as claimed in claim 1 wherein the elastomeric material of said member is a synthetic polymer.

3. A blade assembly as claimed in claim 2 wherein the polymer is a polyurethane.

4. A blade assembly as claimed in claim 1 wherein the casing member is made of a metallic material and wherein said blades are made at least partly of synthetic resin material.

5. A blade assembly as claimed in claim 1 wherein the casing member forms at least part of a casing, the said blades being stator blades.

6. A blade assembly as claimed in claim 1 wherein the elastomeric material of said member is a copolymer.